United States Patent

[11] 3,615,790

| [72] | Inventor | Marion R. Lytton |
| | | West Chester, Pa. |
| [21] | Appl. No. | 634,091 |
| [22] | Filed | Apr. 27, 1967 |
| [45] | Patented | Oct. 26, 1971 |
| [73] | Assignee | FMC Corporation |
| | | Philadelphia, Pa. |

[54] GENERAL DYE-ASSIST FOR SYNTHETIC FIBERS
6 Claims, No Drawings

[52] U.S. Cl. .................................................. 106/165,
8/31, 8/100, 106/176, 106/168, 106/169
[51] Int. Cl. ..................................................... C08b 21/16,
C08b 21/20, C08b 27/54
[50] Field of Search ........................................ 106/16.5,
176, 168, 169; 260/32.6 N, 30.8, 328, 327, 607,
79.3 M, 45.7 SU; 8/DIG. 2

[56] References Cited
UNITED STATES PATENTS

| 2,870,216 | 1/1959 | Sorensen et al. | 260/327 |
| 3,000,762 | 9/1961 | Tesoro | 8/DIG. 2 |
| 3,032,625 | 5/1962 | Horn | 8/DIG. 2 |
| 3,420,850 | 1/1969 | Dittman et al. | 260/79.3 M |
| 3,379,681 | 4/1968 | Kopacki et al. | 260/45.7 SU |

OTHER REFERENCES

Wengraf, American Dyestuff Reporter, July 18, 1955, Page 503

*Primary Examiner*—Allan Lieberman
*Attorneys*—Thomas R. O'Malley, George F. Mueller and Robert G. Hoffman ABSTRACT: Artificial, shaped articles of polymeric material having improved dyeability are provided by the incorporation therein of sulfones containing alpha-methylene groups.

The dye receptability of artificially prepared fibers, yarns, fabrics and other shaped articles in often in need of improvement, so that these materials can be deep dyed in various types of dyeing procedures. While methods for improving the dyeability of various artificial fibers, including, for example, rayons, acetates, triacetates, acrylics, modacrylics, vinyons, sarans and the like are known, such methods generally vary from one type of fiber to another.

GENERAL DYE-ASSIST FOR SYNTHETIC FIBERS

It is an object of this invention to provide artificial filaments, fibers and other shaped articles having improved dye-receptivity.

It is another object of this invention to provide a general method for improving the dye-receptivity of synthetic filaments and fibers.

These objects are accomplished in accordance with this invention by providing artificial shaped articles of cellulosic and thermoplastic polymeric materials having incorporated therein a sulfone having alpha-methylene groups adjacent thereto in an amount sufficient to improve the dye-receptivity of the articles.

Examples of sulfones of the type useful for this invention include the sulfone of trithiane, the sulfone of m- or p-thioxane, the disulfone of dithiane (diethylene disulfide), the disulfone of 3,6-dithiaoctane ($C_2H_5SC_2H_4SC_2H_5$), dibenzyl sulfone, diethyl sulfone, and the like. Di- or polysulfones wherein a methylene group is activated by two sulfone groups, i.e. compounds having included as a part of their structure $-SO_2CH_2SO_2-$, are preferred for the purposes of this invention. The trisulfone of trithiane is particularly preferred. The amount of the sulfone employed is at least sufficient to improve the dye-receptivity of the artificial article in which it is incorporated and preferably from about 0.5 to about 1.5%, based on the weight of the article.

The present invention also includes a method of preparing shaped articles having improved dye-receptivity comprising incorporating a sulfone having alpha-methylene groups adjacent thereto in a liquid spinning preparation for cellulosic or thermoplastic polymeric materials, spinning the liquid preparation to form a shaped article and solidifying the article. The article may be solidified by subjecting it to a gaseous or liquid solidifying medium. These sulfones are valuable for the purposes of this invention, since they not only improve the dyeability of the artificial fiber or other article, but are easily incorporated into them during their manufacture. The sulfones are sufficiently soluble in various spinning solutions or solvents including viscose, acetate dopes, dimethyl formamide, dimethyl acetamide, dimethyl sulfoxide, cyclohexanone, etc., to enable them to be spun uniformly into the shaped articles. They are also sufficiently insoluble in the customary spinning baths to permit their use in wet spinning procedures. Thus, for the purposes of this invention, the sulfones are sufficiently insoluble in typical regenerated cellulose spin baths, acetate and triacetate baths, acrylonitrile polymer spin baths, polyvinyl chloride spin baths, and the like.

The sulfones of this invention are generally prepared by oxidation of the corresponding thioether.

The following examples are set forth to demonstrate the invention.

EXAMPLE I 3.15 grams (0.0228 mol) of cyclic trimethylene sulfide (S-trithiane), is dispersed in 80 cc. of glacial acetic acid at room temperature. 25 grams of a 30% aqueous solution of hydrogen peroxide is added to the dispersion with stirring. There is an exotherm to about 45° C., with the dispersed trithiane going into solution. The solution is allowed to stand overnight. The solution, with partially precipitated sulfone, is heated to 90° C. on a steam bath for two hours. The mixture is then cooled and refrigerated, and the sulfone is filtered from the mixture and dried. In several runs of the above, yields ranged from 4.0 g. to 4.5 g. Sulfur analyses ranged from 49.1% (60% oxidized) to 44.2% (81.5% oxidized).

The formed cyclic trimethylene sulfone is soluble in 6% sodium hydroxide and insoluble in a typical rayon spinning bath. It is soluble in acetate dope, dimethyl formamide, dimethyl acetamide, dimethyl sulfoxide and other spinning solvents and precipitates in conventional polyacrylonitrile spin baths, i.e. water, and water-solvent mixtures.

An amount of the cyclic trimethylene sulfone is dissolved in a 25% solution of polyacrylonitrile in dimethyl formamide to provide a concentration of 1% sulfone in the solution. This solution is dry spun at a temperature of 130° C. into a fiber which is hot stretched. The fiber is evenly dyed with basic dyes.

A similar fiber is produced by wet spinning into a water bath to produce a fiber having improved dyeability.

EXAMPLE II 23.7 grams (0.228 mol) of p-thioxane is dissolved in 250 cc. of glacial acetic acid. 76 cc. of a 30% aqueous solution of hydrogen peroxide is added dropwise to the acetic acid solution over a two hour period while the temperature of the mixture is held within a range of 0° to 10° C. The mixture is then allowed to warm to room temperature and kept there for 72 hours. The acetic acid is evaporated to about 25 cc., and the solid remainder filtered, dried, and ground.

The yield of sulfone of thioxane is 30.6 g. (98.5%) and the melting point is 128°-9° C. Sulfur found is 22.8%, while theoretical sulfur is 23.5%.

The sulfone of thioxane is dissolved in a viscose spinning solution to provide a concentration of 0.5%, based on the weight of the cellulose. The viscose is conventionally spun through a spinneret into an aqueous acid bath containing 7.2% sulfuric acid, 1.0% zinc sulfate and 20% sodium sulfate, based on the weight of the bath.

The spun filaments are dried and then run through a basic dye bath. The filaments demonstrate improved dye-receptivity over conventional rayon without the sulfone additive.

EXAMPLE III 17.3 grams of 3,6-dithiaoctane ($C_2H_5SC_2H_4SC_2H_5$) is dissolved in 250 cc. of glacial acetic acid. 76 cc. of a 30% aqueous solution of hydrogen peroxide is added dropwise to the acetic acid solution over a 2 hour period while the temperature of the mixture is held to 0°-10° C. The mixture is then allowed to warm to room temperature and kept there for 72 hours. The acetic acid is evaporated to about 25 cc., and the solid remainder filtered, dried and ground.

The yield of disulfone of dithiaoctane is 24.0 g. (98.5%) and the melting point is 133.5° C. The sulfur is 29.0%, while theoretical sulfur present is 29.9%. The sulfone is soluble in 6% sodium hydroxide, but insoluble in regenerated cellulose spinning baths. Cellulose acetate filaments dry spun from acetate dope containing 1.0% by weight of the above disulfone, based on the weight of the cellulose acetate, demonstrate much improved dyeability when treated in disperse dye baths.

EXAMPLE IV 13.8 grams of 1,4-dithiane is dissolved in 250 cc. of glacial acetic acid by warming to 80° C., and then cooling to the start of crystallization (30° C.). 76 cc. of 30% aqueous hydrogen peroxide is added dropwise over 1½ hours at 25°-30° C. The mixture is kept at room temperature for 72 hours and then acetic acid is evaporated until about 25 cc. remains. The solid is filtered, dried and ground to yield 20.2 gm. (97%) of the disulfone of dithiane.

1.5%, based on the weight of the resin, of the above disulfone is dissolved in a 15% cyclohexanone solution of crystallizable polyvinyl chloride. This solution is hot spun (130° C.) into a coagulating bath comprising 24% cyclohexanol, 26% ethanol and 50% water at 80° C. The spun filaments are drawn over 700% in boiling water and heat set at 190° C.

The crystalline fibers have good dye-receptivity when dyed in a basic dye bath.

While the present invention has been demonstrated with special emphasis on filaments, the invention is also applicable to other shaped articles, including films, bands, and molded articles formed from cellulosic and thermoplastic polymeric materials.

Various changes and modifications may be made practicing this invention without departing from the spirit and scope

I claim:

1. An artificial, shaped article of regenerated cellulose or cellulose esters containing dispersed therein from about 0.5 to 1.5%, based on the weight of the article, of a sulfone having alpha-methylene groups adjacent thereto, said sulfone being soluble in liquid spinning preparations for manufacturing said articles.

2. The shaped article of claim 1 wherein the article is a filament.

3. The shaped article of claim 1 wherein the sulfone is a sulfone of thioxane.

4. A method of preparing shaped articles of regenerated cellulose and cellulose esters having improved dye-receptivity comprising incorporating from about 0.5 to 1.5%, based on the weight of the shaped article, of a sulfone having alpha-methylene groups adjacent thereto into a liquid spinning preparation for manufacturing said shaped articles, said sulfone being soluble in said liquid spinning preparations, forming said liquid preparation into a shaped article, and solidifying the shaped article.

5. The method of claim 4 wherein the liquid preparation is viscose.

6. The method of claim 4 wherein the liquid preparation is a cellulose ester solution.

* * * * *